United States Patent [19]

Grant et al.

[11] 4,316,568

[45] Feb. 23, 1982

[54] METHODS AND APPARATUS FOR GUIDING TAPE

[75] Inventors: Frederic F. Grant, Bellflower; Nancy L. Sarkisian, Pasadena, both of Calif.

[73] Assignee: Bell & Howell Company, Chicago, Ill.

[21] Appl. No.: 63,323

[22] Filed: Aug. 2, 1979

[51] Int. Cl.³ .................. B65H 17/42; G11B 15/58
[52] U.S. Cl. .................................. 226/118; 226/97; 242/182
[58] Field of Search .............. 226/7, 95, 97, 118; 242/182, 183, 184, 185, 76; 360/95

[56] References Cited

U.S. PATENT DOCUMENTS

| | | | |
|---|---|---|---|
| 2,862,715 | 12/1958 | MacDonald | 274/11 |
| 3,106,357 | 10/1963 | Kobayashi et al. | 242/184 |
| 3,281,040 | 10/1966 | Grant | 226/97 |
| 3,776,487 | 12/1973 | Henderson | 242/182 |
| 4,091,979 | 5/1978 | Browder | 226/7 |
| 4,206,890 | 6/1980 | Barton, Jr. et al. | 242/184 |

FOREIGN PATENT DOCUMENTS

| | | |
|---|---|---|
| 599159 | 9/1945 | United Kingdom . |
| 636822 | 5/1950 | United Kingdom . |
| 1165696 | 10/1969 | United Kingdom . |
| 1345096 | 1/1974 | United Kingdom . |
| 1422071 | 1/1976 | United Kingdom . |
| 1479758 | 7/1977 | United Kingdom . |

*Primary Examiner*—Leonard D. Christian
*Attorney, Agent, or Firm*—Luc P. Benoit

[57] ABSTRACT

Tape guiding methods and apparatus advance a tape through an arcuate bend having equal radii at both edges. Within that bend an unbalance providing a net force transversely of the tape is created at the tape edges while maintaining the equal radii. The advancing tape is guided by applying it with the created net force to a reference surface while maintaining the equal radii.

34 Claims, 2 Drawing Figures

METHODS AND APPARATUS FOR GUIDING TAPE

BACKGROUND OF THE INVENTION

1. Field of the Invention

The subject invention relates to methods and apparatus for guiding a tape and, for instance, has utility in magnetic tape transports, photographic film handling apparatus and other tape or web transport or handling equipment wherein precision guidance of a tape, film or other web is required or desired. The subject invention relates also to vacuum columns and to tape transports employing vacuum columns.

2. Disclosure Statement

This disclosure statement is made pursuant to the duty of disclosure imposed by law and formulated in 37 CFR 1.56 (a). No representation is hereby made that information thus disclosed in fact constitutes prior-art inasmuch as 37 CFR 1.56(a) relies on a materiality concept which depends on uncertain and inevitably subjective elements of substantial likelihood and reasonableness, and inasmuch as a growing attitude appears to require citation of material which might lead to a discovery of pertinent material though not necessarily being of itself pertinent.

Throughout the years, many precision guiding techniques and apparatus have been proposed or implemented. By way of example, and not by way of limitation, precision guiding of a tape or web is important in information processing or handling equipment wherein a tape or web shaped information carrier needs to be accurately positioned relative to information recording and playback devices.

A drawback of conventional guiding techniques customarily resides in an imposition of uneven stresses across the tape surface. For instance, U.S. Pat. No. 2,862,715, by D. N. MacDonald, issued Dec. 2, 1958, proposes the use of several tape guides, each having a tapered body bounded by a reference surface extending at right angles to a longitudinal axis through the tapered body. The tapered body, which acts as a tape guide, imposes on the advancing tape a transverse force component by stressing the advancing tape unevenly across its major tape surface. In particular, that tapered guide stresses one edge of the advancing tape more than the other, thereby loading the tape against the straight reference shoulder provided at the base of the tapered body. This, in turn, has the drawback of prompting the tape to ride up or curl up on the reference shoulder, thereby adding further wear and tear to the wear and tear already occasioned by the uneven stresses imposed on the tape by the tapered guide.

A further type of web guide is apparent from U.S. Pat. No. 3,281,040, by F. F. Grant, issued Oct. 25, 1966. According to that proposal, a positive pressure gradient is established at the guiding element so that the moving web tends to slide "downhill" of the gradient and the edge of the web adjacent a guiding shoulder is brought into contact with that shoulder. Web guides of this type are useful in some applications but tend to be relatively long, bulky and air consumptive.

Further tape guide systems are apparent from U.S. Pat. No. 4,091,979, by L. B. Browder, issued May 30, 1978 to the subject assignee. While those systems afford a very high tape guiding precision, they would share with conventional approaches the disadvantage of tape curlup, if they employ a straight reference shoulder extending at right angles to the tape guiding surface. Such systems are further vulnerable to the effects of tape width variation or non-straightness of tape edges. Even with high-quality tape, variations of the order of 0.002/0.003 inches (50–75$\mu$) are relatively frequent and result in a substantial variation of the force between the tape edge and adjacent reference shoulder, eventuating curling of the tape edge and climbing thereof onto the reference surface.

An excellent tape guide with one or more sloping reference surfaces is apparent from copending U.S. patent application Ser. No. 58,225, filed July 16, 1979 by F. F. Grant and H. M. Martija, and assigned to the subject assignee.

In its embodiment, that tape guiding system employs a tiltable roller for imposing a yaw motion on the advancing tape, applying same to the sloped reference surface or surfaces.

Reference may also be had at this juncture to the contents of the disclosure statement of the latter copending patent application, as far as further prior proposals are concerned.

A persistent problem with even the highly advanced systems so far discussed stems from the fact that an imposition of unequal radii at the two tape edges within a provided bend of the tape is inherent therein.

This applies also to a past proposal to slant the sides of a vacuum column so as to urge the tape traveling in a loop through the vacuum column against a reference surface. In particular, the slanted sides of the vacuum column in that proposal necessarily impose unequal radii on the two tape edges of the bight portion of the U-shaped tape loop in the vacuum column.

In brief, there exists a need for tape guiding methods and apparatus which are characterized by an inherent provision and preservation of equal radii at both edges of a tape advancing through a requisite arcuate bend.

SUMMARY OF THE INVENTION

It is a general object of this invention to overcome the disadvantages and to meet the needs expressed or implicit in the above disclosure statement or otherwise set forth herein.

It is a related object of this invention to guide a tape or web; with "tape" and "web" being employed herein as equivalent expressions.

It is a germane object of this invention to provide improved methods and apparatus for guiding a tape.

It is also an object of this invention to provide improved tape transports.

It is a related object of this invention to provide improved tape vacuum columns and improved tape transport methods and apparatus employing vacuum columns.

It is a related object of this invention to provide improved magnetic tape or other information recording and playback equipment.

Other objects of this invention will become apparent in the further course of this disclosure.

From a first aspect thereof, the subject invention resides in a method of guiding a tape having two opposite tape edges, comprising in combination the steps of providing in the tape a floating arcuate bend having equal radii at both of the tape edges, advancing the tape through the bend having said equal radii, creating within the bend at the tape edges an unbalance providing a net force transversely of the tape while maintaining said equal radii, and applying the advancing tape at one of the tape edges with said net force to a reference surface while maintaining said equal radii.

From another aspect thereof, the subject invention resides in apparatus for guiding a tape having two opposite tape edges, comprising, in combination, means for providing in the tape a floating arcuate bend having equal radii at both of the tape edges, means coupled to the tape for advancing the tape through the bend having said equal radii, and means for creating within the bend at the tape edges an unbalance providing a net force transversely of the tape for applying the advancing tape at one of the tape edges with said net force to a reference surface while maintaining said equal radii.

From another aspect thereof, the subject invention resides in apparatus for guiding a tape, comprising, in combination, a tape vacuum column delimited by first and second surfaces, by a third surface extending between and perpendicularly to the first and second surfaces, and by a fourth surface extending between the first and second surfaces in parallel to the third surface one of the third and fourth surfaces including a reference surface for guiding the tape, means for drawing into the vacuum column a loop of the tape extending through a first leg along part of the first surface, through a second leg along part of the second surface, and through a bight portion between the first and second legs and transversely of the third and fourth surfaces, means for advancing the tape through the legs and the bight portion in the vacuum column, means for drawing a fluid past the bight portion through a first fluid leakage having a first cross-sectional configuration at the third surface and a different second cross-sectional configuration at the fourth surface; and means for applying the advancing tape to the reference surface by the drawing of fluid.

Other aspects of the subject invention will be disclosed in the further course hereof.

BRIEF DESCRIPTION OF THE DRAWINGS

The subject invention and its aspects and objects will become more readily apparent from the following detailed description of preferred embodiments thereof, illustrated by way of example in the accompanying drawings, in which like reference numerals designate like or functionally equivalent parts, and in which.

DESCRIPTION OF PREFERRED EMBODIMENTS

Figure 1:
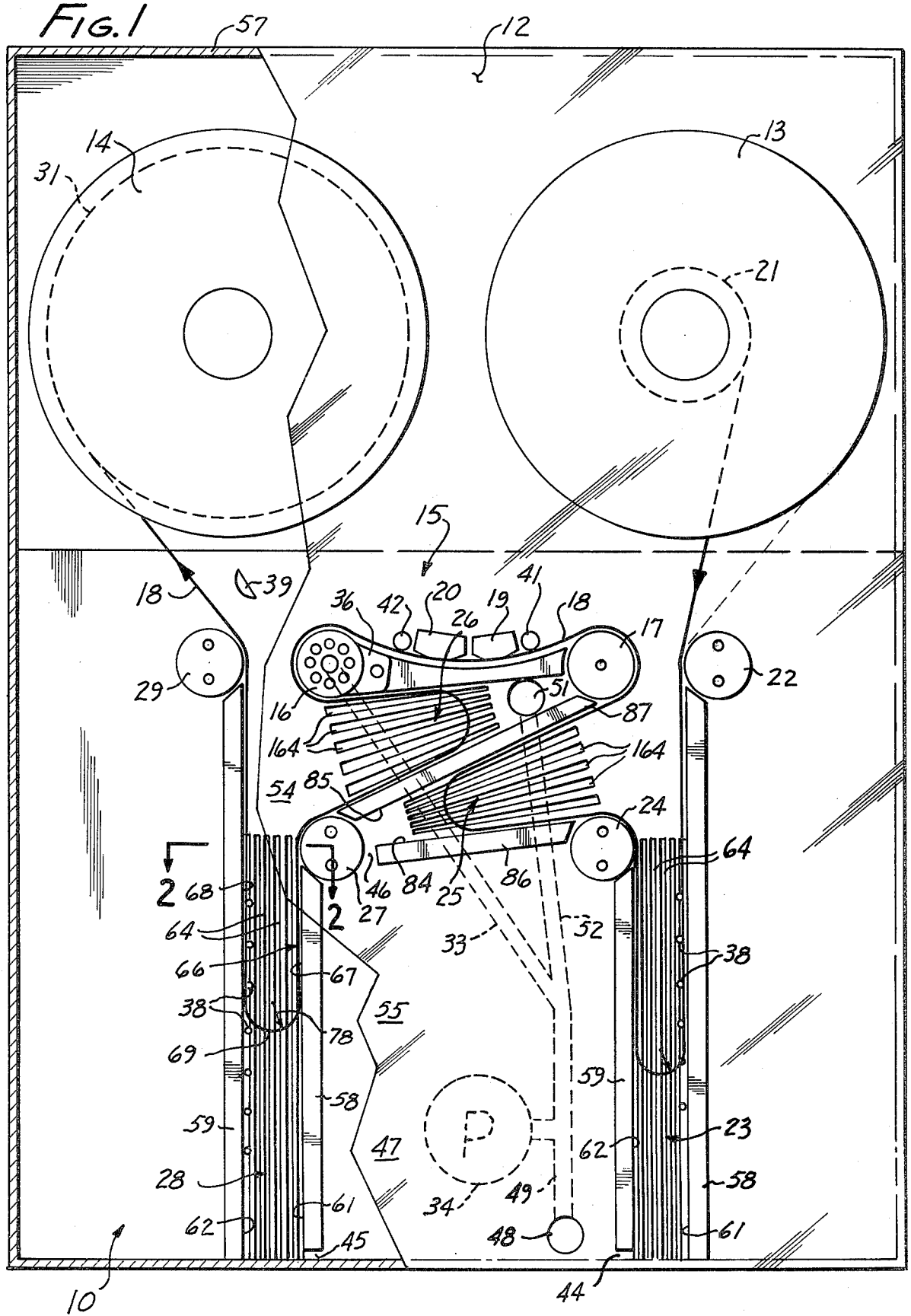
FIG. 1 is an elevation of a magnetic tape transport embodying the subject invention.

Briefly, the magnetic tape transport 10 shown in FIG. 1 has a baseplate 12 rotatably supporting a tape supply reel 13 and a tape takeup reel 14.

The baseplate 12 preferably is somewhat recessed relative to a baseplate or deck 15 so as to take into account the presence and thickness of the inside sheaves or flanges of the tape reels 13 and 14.

The deck 15 rotatably supports a tape capstan 16 which cooperates with a tape guide 17 in transporting magnetic recording tape 18 past record and reproduce head stacks 19 and 20.

In the operation of the tape transport, magnetic recording tape 18 is advanced from a tape supply roll 21 on the reel 13 along a tape path defined by or traversing a tape guide 22, tape vacuum column 23, tape guide 24, tape loop former 25, guide 17, magnetic head stacks 19 and 20, capstan 16, loop former 26, tape guide 27, tape vacuum column 28 and tape guide 29, to a tape roll 31 on the takeup reel 14.

The tape capstan 16 may be driven by a conventional capstan drive with servo loop control. In accordance with a preferred embodiment, the grooved capstan system disclosed in the copending U.S. patent application Ser. No. 968,330, filed Dec. 11, 1978, by F. F. Grant, assigned to the subject assignee, and herewith incorporated by reference herein, may be employed.

As disclosed in the latter patent or application, the capstan 16 preferably is a vacuum capstan which attracts successive portions of the advancing tape, mainly for the purpose of increased traction along the wrap angle or effective capstan surface. To this end, the capstan preferably is hollow and stands in communication via a conduit 33 with a vacuum pump 34. As also disclosed in the latter patent application, the capstan 16 may have peripheral apertures through which a fluid, such as air, is drawn by the pump 34 in order to attract the tape to an effective arc along the capstan.

As further disclosed in the latter patent application, the capstan 16 may have associated therewith a block 36 which shields the tape against detrimental vacuum attraction on its way to and from the capstan 16. To this end, and as disclosed in the latter patent application, the capstan 16 and tape guide block 36 may have a series of interdigitated ridges and corresponding grooves, with the ridges and grooves of the capstan extending circumferentially about, and alternating across, the capstan. Moreover, the circumferential capstan ridges ride in corresponding arcuate grooves of the block 36, while arcuate ridges of that block extend into corresponding circumferential grooves of the capstan 16.

Those skilled in the art of instrumentation tape recorders and similar equipment will recognize that the tape transport 10 will in practice be equipped with reel hub assemblies which releasably carry the tape reels 13 and 14 and with reel drives which may be of a conventional type in order appropriately to drive the reels 13 and 14 of the tape transport.

Equipment of this type typically employs sensors 38 in the vacuum columns 23 and 28 for sensing the lengths of the tape loops in the columns in order to servocontrol the tape reel drives.

In practice, the tape 18 may run either from the reel 13 to the reel 14 as described above, or then from the reel 14 to the reel 13. For fast tape winding or fast tape reversal, the vacuum pump 34 is deenergized or blocked so that the tape may be pulled out of the vacuum columns 23 and 28 and loop formers 25 and 26, in order to extend straightly between the reels 13 and 14 via head stacks 19 and 20 and an auxiliary tape guide 39. Further tape guides 41 and 42 may be employed at the head stacks. The head stacks 19 and 20, in turn, may be withdrawn from the active tape path during rapid winding or fast return of the tape 18 to avoid excessive wear thereof.

Preparatory to a recording or playback process, a fluid, such as air, is withdrawn with the vacuum pump 34 from the vacuum columns 23 and 28 and loop former 25 through ports 44, 45 and 46, space 47, port 48 and conduit 49. Air is also withdrawn by the pump 34 from the loop former 26 via a port 51 and conduit 52 and from the capstan 16 via conduit 33.

The tape 18 will thus assume essentially the floating loop configuration and position shown in FIG. 1.

The loop formers 25 and 26 include wedge-shaped vacuum spaces controlling the extent of the tape loops that can form at 25 and 26. In practice, these tape loops have the advantage of isolating the capstan and tape transport at the head stacks 19 and 20 from the tape reels 13 and 14 and from the inertia of these reels and of the remainder of the tape transport.

In particular, the formation of the loops at 25 and 26 enables practically instantaneous start of the hollow low-inertia capstan 16.

The length of the tape loop in each vacuum column 23 and 28 is monitored by sensors 38, as indicated above. By way of example, these sensors may be of an optical type, having photocells 38 illuminated by corresponding light forces located in a side of the vacuum column, to be successively obstructed by the tape as the loop expands in the column. These and other loop sensors are conventional in the art.

In the operation of equipment shown in FIG. 1, it is very important that the individual heads or elements of the reproduce stack operate accurately in the same tracks as their corresponding respective heads or elements in the recording head stacks. These and other reasons of high precision and accuracy require the tape to be accurately positioned and guided along a reference surface. In the illustrated preferred embodiment, and as shown by way of example in FIGS. 1 and 2, such reference surface may be the top or front surface 54 of the baseplate or deck 15. To prevent loss of vacuum from and contamination of the tape transport, a plate 55 of glass or another suitable material is positioned at a distance from the baseplate 15. The plate 55 thus has a surface 56.

The baseplates 12 and 15 and the front or glass plate 55 are mounted in the frame 57 of the illustrated equipment. To improve performance, one or more of the guides 17, 22, 24, 27, 29, 39, 41 and 42 may be structured and operated as air bearings.

In addition to including parts of the plates 15 and 55, the vacuum columns 23 and 28 are also formed by lateral walls 58 and 59 extending between the plates 15 and 55 in fluid-tight relationship therewith.

Each vacuum column is thus defined or delimited by parallel first and second surfaces 61 and 62, by a third surface 54 extending between the first and second surfaces, and by a fourth surface 56 extending between these first and second surfaces in parallel to the third surface 54.

In accordance with principles of the subject invention, the third and fourth surfaces 54 and 56 have different surface configurations with respect to the flow of a fluid relative thereto. By way of example, and in accordance with the illustrated preferred embodiment, the third or reference surface 54 has grooves or channels 64. In particular, the grooves 64 may extend along the third surface 54. In principle, and in accordance with the broad aspects of the subject invention, the grooves 64 could extend across the vacuum columns. However, as shown in FIGS. 1 and 2, it is presently preferred that the grooves 64 extend along the third surface 54 in parallel to the first and second surfaces 61 and 62 or longitudinally of the vacuum column.

The pump 34 acts through ports 44, 45 and 48 and vacuum space 47 in drawing a fluid, such as air, into each vacuum column to form a loop of tape therein. In particular, the loop of tape 66 is drawn to extend through a first leg 67 along part of the first surface 61, through a second leg 68 along part of the second surface 62, and through a bight portion 69 between the first and second legs 67 and 68 and transversely of the third and fourth surfaces 54 and 56.

By way of contrast, and for a better understanding of the subject invention, it may be helpful at this juncture to consider relevant prior-art configurations.

Figure 2:
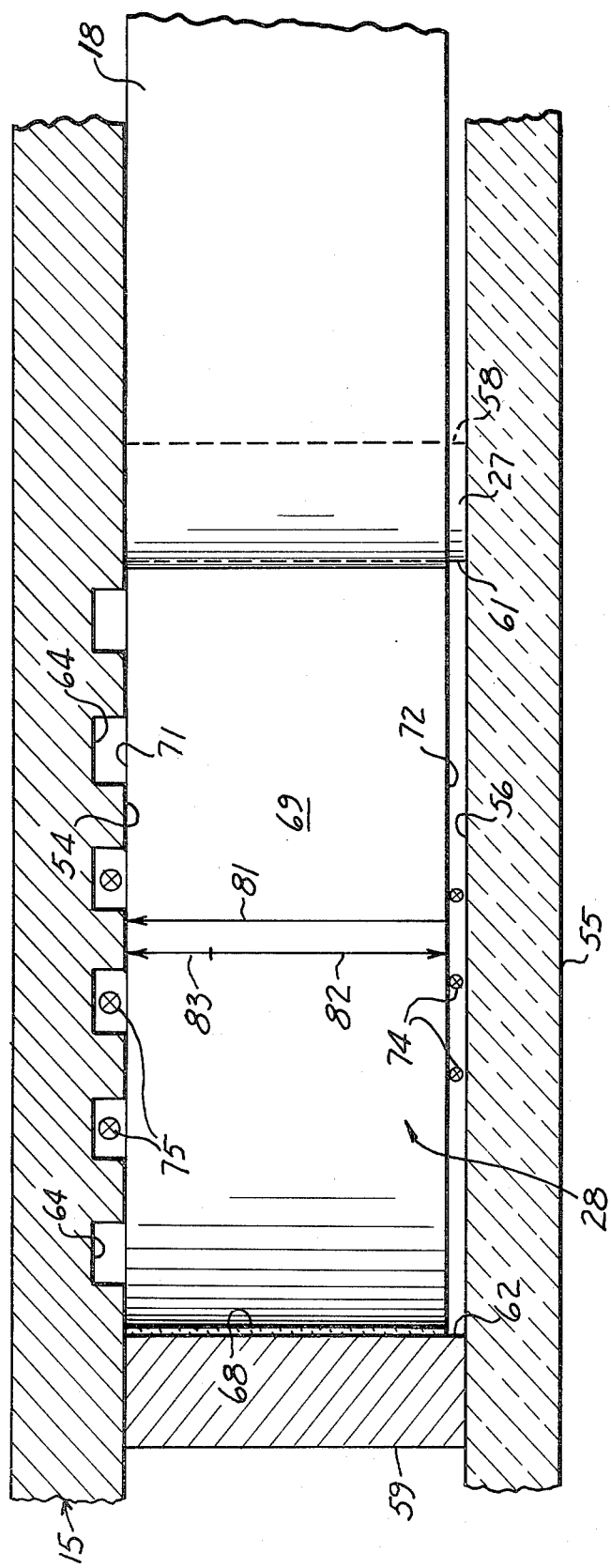
FIG. 2 is a section, on an enlarged scale, taken along the line 2—2 in FIG. 1, and showing tape guiding methods and apparatus according to a preferred embodiment of the subject invention.

In particular, and in contrast to the showing in FIGS. 1 and 2, corresonding surfaces 54 and 56 of a conventional vacuum column would have at least practically identical surface configurations with respect to the flow of a fluid relative thereto. Typically, the surfaces 54 and 56 would both be flat and continuous in a conventional vacuum column. In that case, fluid or air drawn by the vacuum pump 34 would affect the tape 18 at both of its tape edges 71 and 72 equally. The resulting forces across the tape with respect to the edges 71 and 72 would thus be equal and the tape would assume a balanced position between the surfaces 54 and 56. In other words, there would be a space between the tape edge 71 and the surface 54 in a conventional vacuum column, with the width of such space during normal operation of the vacuum column being equal to the width of a corresponding space between the surface 56 and tape edge 72.

In high-precision equipment, such a balanced tape positioning would not suffice in terms of tape guidance precision, but would necessitate a special guiding mechanism with one or more specific reference surfaces for that purpose.

In an endeavor to exploit the deck surface 54 as a reference surface, a prior approach slanted the sides 58 and 59 or first and second surfaces 61 and 62 of the vacuum column so as to urge the tape traveling in the loop 66 against the surface 54.

That proposal, however, by its V-shaped or corresponding slanting of the sides 58 and 59 at surfaces 61 and 62, inevitably imposed unequal radii on the bight portion 69 at the tape edges 71 and 72. In particular, starting from the largest radius at the tape edge 72, the radius of the U-shaped tape loop diminished constantly to reach a minimum value at the tape edge 71 engaging the then flat reference surface 54.

Among the implications of such a radius variation, it is seen that the tape loop 66 acts like a beam in the vacuum column which is bent in a direction across the tape if the bight portion 69 has unequal radii at the tape edges and across the tape.

This tape bending or warping action tends to reflect itself into sensitive portions of the tape transport including the capstan and playback and recording head areas, either directly or indirectly via the regular tape winding and unwinding processes.

These and other prior disadvantages are avoided by the subject invention.

Reverting first to the preferred embodiment shown in FIGS. 1 and 2, it is seen that the vacuum pump and column draw fluid or air past the tape edge 72 through a gap between that edge 72 and the surface 56, as indicated by top-view arrow symbols 74.

Conversely, the vacuum pump and column draw air past the edge 71 through the grooves 64, as indicated by top-view arrow symbols 75, whereby the tape at its edge 71 is applied to the reference surface 54.

This interesting guidance effect according to the subject invention has been verified by tests and in prototype work, although its finer ramnifications have so far eluded theoretical analysis.

However, the subject invention and its embodiments will now be more fully described in their implications and practical applications, with the aid of FIGS. 1 and 2.

In particular, methods and apparatus according to the subject invention for guiding a tape having two opposite tape edges provide in that tape 18 a floating arcuate bend 69 having equal radii 78 at both of the tape edges 71 and 72. This establishment and preservation of equal radii or, in other words, of an equal radius throughout the width of the tape at the bend 69 is an important distinguishing feature of the subject invention, since it liberates the tape guiding function from its prior-art limitation of inherent radius inequality at opposite tape edges or across the bent tape portion.

The capstan 16 and reel drives advance the tape through the bend 69 having the equal radii 78. The unilaterally provided grooves 64 or the above mentioned different surface configurations at 54 and 56 create within the bend 69 at the tape edges 71 and 72 or across the tape 18 an unbalance.

In FIG. 2, this unbalance is symbolically illustrated by a first arrow or vector 81 with respect to one of the edges and by a second arrow or vector 82 with respect to the other of the edges 71 and 72.

In practice, this unbalance provides a net force transversely of the tape while, however, maintaining the equal radii 78 at the edges 71 and 72 or, in other words, the uniform radius throughout the width of the tape.

In FIG. 2, the net force thus generated is symbolically indicated by an arrow or vector 83, as the vectorial differences between the vectors 81 and 82 generated by the flow of fluid or air past the tape edges 71 and 72.

The advancing tape 18 is applied at one of its tape edges 71 with the net force 83 to the reference surface 54, while again maintaining the equal radii 78 at both tape edges 71 and 72.

Considering the subject disclosure in detail, it should be recognized that the present invention has utility beyond the illustrated preferred embodiment, inasmuch as the arcuate bend and requisite fluid flow could be implemented by means other than a vacuum column.

An embodiment of the subject invention creates the requisite unbalance by establishing at the bend 69 past the two tape edges 71 and 72, respectively, first and second fluid leakages 74 and 75 of different configurations.

As illustrated in FIG. 2, for example, these different fluid leakage configurations may in practice be different cross-sectional configurations.

With respect to the one tape edge 71 and the other edge 72, an embodiment of the subject invention establishes at the bend 69 a first fluid leakage 74 between the other tape edge 72 and a further surface 56 spaced from the reference surface 54, and further establishes at the bend 69 a second fluid leakage 75 past the one tape edge 71 and alongside and below the reference surface 54. Preferably, and as shown in FIG. 2, the second fluid leakage 75 is channeled past the one tape edge 71 and alongside and below the reference surface 54.

In particular, the reference surface 54 is preferably provided with spaced channels 64 extending below the reference surface 54, and the mentioned second fluid leakage 75 past the one tape edge 71 is established through the channels 64.

In these embodiments, fluid, such as air, is moved into and past the bend 69, preferably by drawing a vacuum below such tape bend. The tape bend, in turn, is provided about a 180° arc in the illustrated vacuum columns, but arcs of smaller and larger angles are within the contemplation and scope of the subject invention.

In practice, the sum of the cross-sectional areas of the channels 64 corresponds to the cross-sectional area of the gap adjacent the other tape edge 72.

Practical tests and prototype work have indicated that the sum of the cross-sectional areas of the channels 64 should be somewhat larger than the cross-sectional area of the gap at the other tape edge 72, so as to provide for a secure, but not excessive, application of the advancing tape to the reference surface 54.

If desired, the grooves 64 or another first cross-sectional fluid leakage configuration could be provided in the front or cover plate 55 or in the fourth surface 56, with the deck 15 or third surface 54 being then provided with a flat or other different second cross-sectional fluid leakage configuration.

In that case, the inside surface 56 of the front plate 55 would be employed as a tape guidance reference surface.

The teaching, principles and embodiments of the subject invention so far primarily disclosed with respect to the vacuum columns 23 and 28 may alternatively or additionally be applied to the loop formers 25 and 26. In this respect, it may be noted that these loop formers, too, are vacuum columns.

In particular, the vacuum column 25 is defined or delimited by converging first and second surfaces 84 and 85 of partition walls 86 and 87, respectively. The vacuum column 25 is further defined or delimited by the third surface 54 extending between and perpendicularly to the first and second surfaces 84 and 85, and by the fourth surface 56 extending between the first and second surfaces 84 and 85 in parallel to the third surface 54.

In the illustrated preferred embodiment, the third surface 54, of course, is the surface of the baseplate or deck 15 which faces the observer in FIG. 1 and part of which is apparent in FIG. 2. The fourth surface 56, in turn, is the inner surface of the cover plate 55, part of which is apparent in FIG. 2.

As a unifying feature of the vacuum columns 23 and 28 and of the loop formers or vacuum columns 25 and 26, the third surface 54 extends perpendicularly to the first and second surfaces 61 and 62 or 84 and 85. This is an important feature, since it preserves the establishment and maintenance of equal radii 78 at both tape edges 71 and 72 throughout the operation of the particular vacuum column. In this respect, the radius 78 remains constant throughout the useful range of the lengths of the tape loops 66. The radius 78 thus is not only uniform across the tape 18 at the bend 69 at any given instant in the operation of the loop 66, but remains also constant throughout the useful length variation of the loop.

In the loop formers or vacuum columns 25 and 26, the radius of the tape bend diminishes with increasing loop length. However, according to the principles of the subject invention, each tape bend in the loop formers or vacuum columns 25 and 26 still has equal radii at both tape edges 71 and 72 throughout its useful range of operation. In other words, each tape bend in the vacuum columns 25 and 26 has a uniform radius thereacross at each instant of its useful operation.

Thus, while the first and second surfaces 84 and 85 are convergent rather than parallel, they do extend perpendicularly to the third surface 54 to establish and maintain the equal radii or uniform radius, as just described.

In the loop formers or vacuum columns 25 and 26, the tape bend extends about an arc subtending an angle of less than 180°. However, as between the vacuum columns 23, 25, 26 and 28, it may be said that the tape bend formed therein extends or is provided about an arc subtending an angle of up to 180°.

The teachings of the subject invention concerning the different surface configurations of the third and fourth surfaces, extensively disclosed above with reference to the vacuum columns 23 and 28, may also be applied to the loop formers or vacuum columns 25 and 26. Without intending any limitation of the generality of this statement, grooves 164 have been shown as providing the requisite fluid leakage 75 (see FIG. 2) in the loop formers or vacuum columns 25 and 26.

In the vacuum columns 25 and 26, the grooves 164 correspond in configuration and function to the grooves 64 in the vacuum columns 23 and 28. In principle, the grooves 164 could extend in parallel to each other, even though the first and second vacuum column surfaces 84 and 85 are convergent. However, it is presently preferred as shown in FIG. 1 that the grooves 164 be arranged in a convergent manner corresponding to the convergence of the first and second surfaces 84 and 85.

Due to the operation of the grooves 164 and resulting fluid leakages 75 (see FIG. 2), the above mentioned requisite unbalance and net force 83 (see FIG. 2) are generated for applying the advancing tape 18 with its edge 71 against the reference surface 54 by the drawing of fluid or air into and past the tape bends.

The tape guiding methods and apparatus herein disclosed may serve as the sole tape guiding agency in a practical application. On the other hand, these means and methods according to the subject invention and its embodiments may be employed in conjunction with other tape guiding techniques. For example, the subject tape guiding means and methods may be employed in lieu of or supplemental to a tiltable roller or similar tape guide, in order to apply the advancing tape with one of its edges to any of the advantageous sloping reference surfaces of the highly advanced tape guide disclosed in the above mentioned copending U.S. patent application Ser. No. 58,225.

By way of further example, the generally cylindrical tape guide 17 may be provided with a tapered crown having its largest diameter at the front plate 55. In other words, a portion of the tape closest to the outer edge 72 may be advanced about a tapered guide portion so that the tape is securely applied to the surface 54 or to a reference surface of a further tape guide (not shown).

Similarly, the capstan may be rendered tiltable towards and away from the head stacks 19 and 20. To this end, the capstan drive motor may have a conventional flange (not shown) attached to the baseplate 15 by mounting bolts, and tiltable relative to such baseplate 15 by a number of set screws. In practice, even though such prior-art tape guiding approaches may be employed in the practice of the subject invention, it is clear that the guiding function according to the present invention and its embodiments materially alleviates the drawbacks of prior guiding devices and techniques. In particular, a guiding function effected according to the subject invention effectively reduces the need for such prior-art guiding function as would substantially affect the quality of the recording and playback process and the longevity of the tape.

Various modifications and variations are suggested or rendered apparent to those skilled in the art by the subject extensive disclosure.

We claim:

1. A method of guiding a tape having two opposite tape edges, comprising in combination the steps of:
   providing in said tape a floating arcuate bend having equal radii at both of said tape edges;
   advancing said tape through said bend having said equal radii;
   creating within said bend at said tape edges an unbalance providing a net force transversely of said tape while maintaining said equal radii; and
   applying said advancing tape at one of said tape edges with said net force to a reference surface while maintaining said equal radii.

2. A method of guiding a tape having two opposite tape edges, comprising in combination the steps of:
   providing in said tape a floating arcuate bend having equal radii at both of said tape edges;
   advancing said tape through said bend having said equal radii;
   creating within said bend at said tape edges an unbalance providing a net force transversely of said tape while maintaining said equal radii, said creation of said unbalance including the step of establishing at said bend past said two tape edges, respectively, first and second fluid leakages of different configurations; and
   applying said advancing tape at one of said tape edges with said net force to a reference surface while maintaining said equal radii.

3. A method as claimed in claim 2, wherein:
   said different configurations are established as different cross-sectional configurations.

4. A method of guiding a tape having two opposite tape edges, comprising in combination the steps of:
   providing in said tape an arcuate bend having equal radii at both of said tape edges;
   advancing said tape through said bend having said equal radii;
   creating within said bend at said tape edges an unbalance providing a net force transversely of said tape while maintaining said equal radii; and
   applying said advancing tape at one of said tape edges with said net force to a reference surface while maintaining said equal radii;
   said creation of said unbalance including the steps of:
   establishing at said bend a first fluid leakage between the other of said tape edges and a further surface spaced from said reference surface; and
   establishing at said bend a second fluid leakage past said one tape edge and alongside and below said reference surface.

5. A method as claimed in claim 4, wherein:
   said establishing at said bend of a second fluid leakage includes channeling said second fluid leakage past said one tape edge and alongside and below said reference surface.

6. A method of guiding a tape having two opposite tape edges, comprising in combination the steps of:
   providing in said tape an arcuate bend having equal radii at both of said tape edges;
   advancing said tape through said bend having said equal radii;

creating within said bend at said tape edges an unbalance providing a net force transversely of said tape while maintaining said equal radii; and applying said advancing tape at one of said tape edges with said net force to a reference surface while maintaining said equal radii;

said creation of said unbalance including the steps of:

providing said reference surface with spaced channels extending below said reference surface;

establishing at said bend a first fluid leakage between the other of said tape edges and a further surface spaced from said reference surface; and establishing at said bend a second fluid leakage past said one tape edge and through said channels.

7. A method as claimed in claim 2, 3, 4, 5 or 6, wherein the establishment of said first and second fluid leakages includes the step of:

moving a fluid into and past said bend.

8. A method as claimed in claim 1, 2, 3, 4, 5 or 6, wherein:

said bend is provided about an arc subtending an angle of up to 180°.

9. A method of guiding a tape, comprising in combination the steps of:

providing a tape vacuum column;

delimiting said vacuum column by first and second surfaces, by a third surface extending between and perpendicularly to said first and second surfaces, and by a fourth surface extending between said first and second surfaces in parallel to said third surface;

establishing one of said third and fourth surfaces as a reference surface for guiding said tape;

providing said third and fourth surfaces with different surface configurations with respect to the flow of a fluid relative thereto;

drawing into said vacuum column a loop of said tape extending through a first leg along part of said first surface, through a second leg along part of said second surface, and through a bight portion between said first and second legs and transversely of said third and fourth surfaces;

advancing said tape through said legs and said bight portion in said vacuum column;

drawing a fluid past said bight portion and different surface configurations of said third and fourth surfaces; and applying said advancing tape to said reference surface by said drawing of a fluid.

10. A method as claimed in claim 9, including the step of:

creating with said fluid drawing at said bight portion an unbalance providing a net force transversely of said advancing tape.

11. A method as claimed in claim 9, wherein:
said third surface is provided with grooves; and
said advancing tape is applied to said third surface by drawing said fluid past said bight portion through said grooves and between said bight portion and said fourth surface.

12. A method as claimed in claim 11, wherein:
said grooves are provided along said third surface.

13. A method as claimed in claim 11, wherein:
said grooves are provided along said third surface in parallel to said first and second surfaces.

14. A method of guiding a tape, comprising in combination the steps of:

providing a tape vacuum column;

delimiting said vacuum column by first and second surfaces, by a third surface extending between and perpendicularly to said first and second surfaces, and by a fourth surface extending between said first and second surfaces in parallel to said third surface;

establishing one of said third and fourth surfaces as a reference surface for guiding said tape;

drawing into said vacuum column a loop of said tape extending through a first leg along part of said first surface, through a second leg along part of said second surface, and through a bight portion between said first and second legs and transversely of said third and fourth surfaces;

advancing said tape through said legs and said bight portion in said vacuum column;

drawing a fluid past said bight portion through a first fluid leakage having a first cross-sectional configuration at said third surface and a different second cross-sectional configuration at said fourth surface; and applying said advancing tape to said reference surface by said drawing of fluid.

15. A method as claimed in claim 9, 10, 11, 12, 13 or 14, including the step of:

maintaining equal radii at opposite edges of said tape in said bight portion throughout said advancing of said tape and said drawing of a fluid.

16. Apparatus for guiding a tape having two opposite tape edges, comprising in combination:

means for providing in said tape a floating arcuate bend having equal radii at both of said tape edges;

means coupled to said tape for advancing said tape through said bend having said equal radii; and means for creating within said bend at said tape edges an unbalance providing a net force transversely of said tape for applying said advancing tape at one of said tape edges with said net force to a reference surface while maintaining said equal radii.

17. Apparatus for guiding a tape having two opposite tape edges, comprising in combination:

means for providing in said tape a floating arcuate bend having equal radii at both of said tape edges;

means coupled to said tape for advancing said tape through said bend having said equal radii; and means for creating within said bend at said tape edges an unbalance providing a net force transversely of said tape for applying said advancing tape at one of said tape edges with said net force to a reference surface while maintaining said equal radii, said means for creating said unbalance including means for establishing at said bend past said two tape edges, respectively, first and second fluid leakages of different configurations.

18. Apparatus as claimed in claim 17, wherein:
said different configurations are different cross-sectional configurations.

19. Apparatus for guiding a tape having two opposite tape edges, comprising in combination:

means for providing in said tape a floating arcuate bend having equal radii at both of said tape edges;

means coupled to said tape for advancing said tape through said bend having said equal radii; and means for creating within said bend at said tape edges an unbalance providing a net force transversely of said tape for applying said advancing tape at one of said tape edges with said net force to a reference surface while maintaining said equal radii, said means for creating said unbalance including:

a further surface spaced from said reference surface;

means for establishing at said bend a first fluid leakage between the other of said tape edges and said further surface; and means for establishing at said bend a second fluid leakage past said one tape edge and alongside and below said reference surface.

20. Apparatus as claimed in claim 19, wherein:
said establishing means include means for channeling said second fluid leakage past said one tape edge and alongside and below said reference surface.

21. Apparatus for guiding a tape having two opposite tape edges, comprising in combination:

means for providing in said tape a floating arcuate bend having equal radii at both of said tape edges;

means coupled to said tape for advancing said tape through said bend having said equal radii; and means for creating within said bend at said tape edges an unbalance providing a net force transversely of said tape for applying said advancing tape at one of said tape edges with said net force to a reference surface while maintaining said equal radii, said means for creating said unbalance including:

spaced channels in said reference surface extending below said reference surface;

a further surface spaced from said reference surface;

means for establishing at said bend a first fluid leakage between the other of said tape edges and said further surface; and means for establishing at said bend a second fluid leakage past said one tape edge and through said channels.

22. Apparatus as claimed in claim 17, 18, 19, 20 or 21 wherein said means for establishing said first and second fluid leakages include:
means for moving a fluid into and past said bend.

23. Apparatus as claimed in claim 16, 17, 18, 19, 20 or 21, wherein:
said bend providing means include means for bending said tape about an arc subtending an angle of up to 180° C.

24. Apparatus for guiding a tape, comprising in combination:

a tape vacuum column delimited by first and second surfaces, by a third surface extending between and perpendicularly to said first and second surfaces, and by a fourth surface extending between said first and second surfaces in parallel to said third surface, said third and fourth surfaces having different surface configurations with respect to the flow of a fluid relative thereto and one of said third and fourth surfaces including a reference surface for guiding said tape;

means for drawing into said vacuum column a loop of said tape extending through a first leg along part of said first surface, through a second leg along part of said second surface, and through a bight portion between said first and second legs and transversely of said third and fourth surfaces;

means for advancing said tape through said legs and said bight portion in said vacuum column; and means for drawing a fluid past said bight portion and different surface configurations of said third and fourth surfaces, including means for applying said advancing tape to said reference surface by said drawing of a fluid.

25. Apparatus as claimed in claim 24, wherein:
said drawing means include means for creating with said fluid drawing at said bight portion an unbalance providing a net force transversely of said advancing tape.

26. Apparatus as claimed in claim 24, wherein:
said third surface has grooves; and
said drawing means include means for applying said advancing tape to said third surface by drawing said fluid past said bight portion through said grooves and between said bight portion and said fourth surface.

27. Apparatus as claimed in claim 26, wherein:
said grooves extend along said third surface.

28. Apparatus as claimed in claim 26, wherein:
said grooves extend along said third surface in parallel to said first and second surfaces.

29. Apparatus for guiding a tape, comprising in combination:

a tape vacuum column delimited by first and second surfaces, by a third surface extending between and perpendicularly to said first and second surfaces, and by a fourth surface extending between said first and second surfaces in parallel to said third surface one of said third and fourth surfaces including a reference surface for guiding said tape;

means for drawing into said vacuum column a loop of said tape extending through a first leg along part of said first surface, through a second leg along part of said second surface, and through a bight portion between said first and second legs and transversely of said third and fourth surfaces;

means for advancing said tape through said legs and said bight portion in said vacuum column;

means for drawing a fluid past said bight portion through a first fluid leakage having a first cross-sectional configuration at said third surface and a different second cross-sectional configuration at said fourth surface; and means for applying said advancing tape to said reference surface by said drawing of fluid.

30. Apparatus as claimed in claim 24, 25, 26, 27, 28 or 29, including:
means for maintaining equal radii at opposite edges of said tape in said bight portion throughout said advancing of said tape and said drawing of a fluid.

31. In a tape vacuum column, the improvement comprising in combination:
first and second surfaces;
a third surface extending between and perpendicularly to said first and second surfaces; and
a fourth surface extending between said first and second surfaces in parallel to said third surface, said third and fourth surfaces having different surface configurations with respect to the flow of a fluid relative thereto; and
means for drawing a fluid into said vacuum column to form a loop of tape therein, including
means for drawing into said vacuum column said loop of tape to extend through a first leg along part of said first surface, through a second leg along part of said second surface, and through a bight portion between said first and second legs and transversely of said third and fourth surfaces; and
means for maintaining equal radii at opposite edges of said tape in said bight portion throughout said advancing of said tape and said drawing of a fluid.

32. A vacuum column as claimed in claim 31, wherein:

said third surface has grooves.

33. A vacuum column as claimed in claim 31, wherein:

said grooves extend along said third surface.

34. A vacuum column as claimed in claim 31, wherein:

said grooves extend along said third surface in parallel to said first and second surfaces.

* * * * *